Nov. 21, 1967 R. C. BRADFORD ET AL 3,353,261

METHOD OF MAKING A MULTITRACK MAGNETIC TRANSDUCER HEAD

Filed Dec. 30, 1964

INVENTORS
Rex C. Bradford
Miles H. Cook
Henry R. Kelsof

BY Littlepage & Quaintance

ATTORNEYS

United States Patent Office 3,353,261

Patented Nov. 21, 1967

3,353,261

METHOD OF MAKING A MULTITRACK MAGNETIC TRANSDUCER HEAD

Rex C. Bradford, Miles H. Cook, and Henry R. Kelsof, Wappingers Falls, N.Y., assignors to International Business Machines Corporation, New York, N.Y., a corporation of New York Filed Dec. 30, 1964, Ser. No. 422,185
9 Claims. (Cl. 29—603)

The present invention, relates to a multitrack magnetic transducer head for use with a recording and a reproducing apparatus and a method of making the same. In particular, the invention relates to an improved and optically perfectly aligned multitrack transducer head and methods and means for constructing the same. In a special embodiment, this invention relates to a multitrack magnetic transducer head and a single track transducer head both of which, under the teachings of this invention, can be produced at the same time.

In the past whenever a transducer head was needed which contained a plurality of closely spaced single track magnetic transducers, the problem was usually solved by arranging a plurality of individual magnetic heads in a staggered formation along the record member. This arrangement was necessitated by the comparatively large physical dimensions of the individual heads which did not permit a side-by-side arrangement with sufficient small spacing. The total longitudinal extension of the whole array of heads became, therefore, quite substantial and prohibitive in many cases.

In an effort to overcome this problem a number of other methods have been proposed. One such method is shown and described in U.S. Patent 3,145,452, issued to Marvin Camras. This patent teaches the formation of individual track elements each of which is cut and finished singly in separate steps. After the formation of the required number of individual elements, they are assembled together with suitable separators in a sandwich to form a multitrack head. Even though this method constitutes a considerable improvement over practices prior thereto, there are many problems that remain unsolved even in the practice of this method. As just one example, the teachings of the Camras patent do not insure a very accurate gap placement and alignment. This is so because, for one reason, cutting each single track element separately and then assembling several of these elements together creates hazards of gap scatter and consequent gap misalignment. For another reason, when locating each channel separately it becomes necessary to position the gaps relative to some common surface with individual clamps. This procedure creates an added hazard of gap misplacement and misalignment, which may not be detected until the final testing of the completed transducer. Moreover, because of the repetition of a number of steps with the formation of each single track element, this process is inefficient and uneconomical.

Accordingly, it is an object of the present invention to devise a new improved method for forming a multitrack magnetic head which is free from above noted and other defects.

It is another object of the invention to provide a new method of making a multitrack magnetic head whose individual tracks are in so-called optically perfect alignment.

Another object of the invention is the provision of a novel method which takes advantage of modern machining methods to initially form a plurality of single track elements as a single piece.

It is a special object of the invention to provide a novel method whereby a subassembly comprising a plurality of single track elements can be formed in one operation.

Yet another object of the invention resides in the provision of a novel method of making a multitrack magnetic head having superior high frequency performance and high wear resistance.

A further object of the invention is to provide a new method of making a plurality of substantially completed single track elements simultaneously.

Yet another object of the invention is to provide a new method whereby a unitary multitrack magnetic head assembly and separate single track head elements can be formed simultaneously.

Still a further object of the invention is the provision of a novel method for making a multitrack magnetic head, which is both efficient and economical.

These and other objects, features and advantages of the invention will be apparent from the following more detailed description of a preferred embodiment of the invention, as illustrated in the accompanying drawings.

Figure 1:
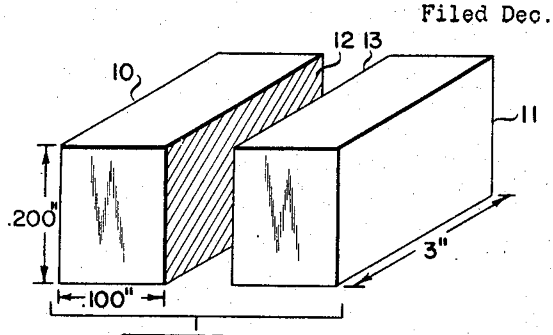
FIGURE 1 is a perspective view of a pair of blocks of a suitable ferrite material having their confronting faces polished to optical flatness.

Briefly, in accordance with the present invention, two blocks of a suitable ferrite or other high resistivity material are cut to the proper shape and smoothed and polished to optical flatness on their confrontnig surfaces by any of the known techniques. The two blocks are then bonded together at their confronting surfaces by means of glass which also acts as the gap spacer in the completed unit. This subassembly, is then relieved along the entire length of the glass bonded surfaces with a V-groove of approximately 90 degrees, about 45 degrees of which normally will be in each of the two halves. The entire length of the blocks is then slotted to form a plurality of spaced channels, or voids, bound in between finger-like projections or cores of the desired pitch, thickness and depth for each individual track element. The projections formed as a result of this channeling are then finished to a desired smoothness and flatness for further assembly.

For each of these projections a jumper of suitable magnetic quality is prepared and wound with the necessary turns of a copper or other suitable coil that will induce into the projections or cores the electromagnetic energy necessary for the proper performance of the transducer. These jumpers or keepers are then secured to the channeled assembly in a known way and non-magnetic fillers or shields are fixedly positioned in each void. Customarily this assembly is then fixed within a housing, the lead wires attached to a connector and the entire assembly potted in a casting resin. In order to obtain the multitrack transducer head, the thusly prepared subassembly in its present intermediate stage advantageously is given a preliminary finish by removing most of the excess portions of the glass bonded blocks above the channeled portion of the subassembly while making sure that sufficient glass remains in those portions of the subassembly which ultimately form the effective gaps of the completed assembly.

A final finish of the desired quality and shape is then applied to the surface of the assembly that comes in contact with the recording medium.

Now referring more particularly to the drawings, there are shown two blocks 10 and 11 of a suitable ferrite or other high resistivity material commonly used for circuit or core pieces in magnetic recording and/or reproducing heads. The sizes of the two blocks are immaterial to the practice of this invention. But for purposes of illustration each of the two blocks is here shown to be 3 inches long, .100 inch wide and .200 inch high. The confronting surfaces 12 and 13 of the two ferrite blocks are then smoothed and polished to optical flatness by any of the known grinding and polishing techniques. Then the two confronting surfaces 12 and 13 are coated with glass, preferably of a composition which has the same, or approximately the same, thermal coefficient of expansion as the material of the blocks. The glass coating may be applied by painting, spraying or placing a thin sheet of glass on at least one of the confronting surfaces and thereafter joining the two blocks by heating the glass coating in a known way such that a glass joint 14 is formed between the two blocks. Alternatively, the glass coating may be applied by introducing the glass between the confronting surfaces by capillary action.

Since the glass joint 14 eventually becomes the effective gap of each individual track element cut into blocks 10 and 11, as described hereinafter, it is necessary to control to specific dimensions the width of the glass bond for final requirements. In the preferred embodiment of this invention, the width of the glass bond sandwiched between the two ferrite blocks is kept between 50 and 150$\mu$ inches.

Figure 2:
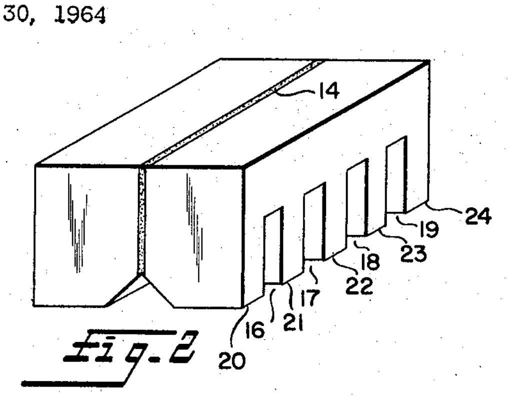
FIGURE 2 is a view in perspective of the two ferrite blocks bonded together and having an approximately 90 degrees V-groove extending throughout the length of the blocks at the bottom of the bonded surfaces and a plurality of channels cut into the two ferrite blocks.

The bonded subassembly, as shown in FIGURE 2, is relieved along the entire length of the blocks 10, 11 with an approximately 90 degrees V-groove 15, in such a manner that the groove extends about 45 degrees in each half. It may be observed here that while the V-groove is preferred in the illustrated invention, this invention would function with a U or other suitably shaped groove. As mentioned before, the entire length of the subassembly is slotted preferably perpendicular to the apex of the groove to form the required number of channels or voids, 16, 17, 18 and 19 in the present case, of the desired pitch, thickness and depth.

Figure 3:
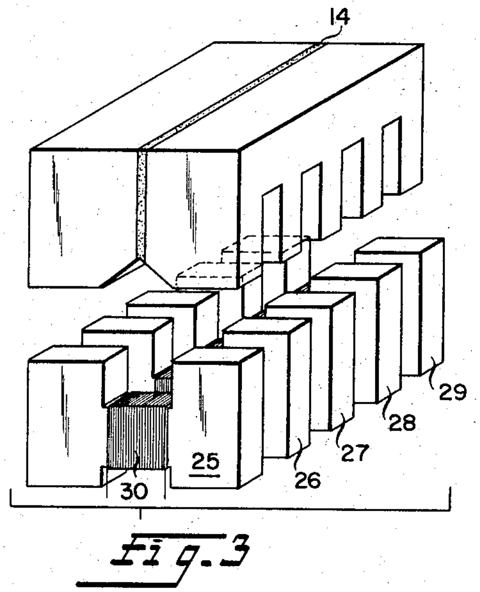
FIGURE 3 is a view in perspective of the bonded blocks of FIGURE 2 just before they are joined to suitably coiled jumpers or keepers of a suitable material.

Projections 20, 21, 22, 23 and 24 formed as a result of channeling are then polished and finished to desired flatness for further assembly. As shown, each of these projections is provided with H-shaped jumper or keeper, such as 25, 26, 27, 28 and 29 (FIGURE 3) of a suitable magnetic quality material and wound with the required number of turns of a copper or other suitable coil 30 that will induce the amount of electromagnetic energy necessary for the proper performance of each individual transducer head and the multitrack transducer head as a whole. Jumpers 25, 26, 27, 28 and 29 are then bonded to the channeled subassembly by means of a suitable bonding material, such as epoxy resin or any other adhesive that will hold the bonded units firmly together.

Non-magnetic fillers, or what are commonly known in the art as spacers or shields, 31, 32, 33, 34 are inserted into each channel or void 16 to 19 and secured firmly by means of a suitable cement to the facing sides of their respective projections 20 to 24. The thus completed assembly is then fixed within a housing (not shown here), its lead wires attached to a connector, and the entire assembly potted with a casting resin.

In the prior art methods, as exemplified by the Camras patent referred to above, after the two ferrite blocks are bonded together, they are divided and sliced into a plurality of subunits which are then suitably shaped and finished to form small individual transducer heads. In order to form a unitary multitrack structure comprising a plurality of single track elements, the finished subunits are then reassembled and positioned both with respect to each other and the non-magnetic fillers or shields. Needless to say this cutting of the unfinished assembly into a plurality of single track elements followed by shaping and finishing of each individual element, one at a time, and thereafter assembling the finished individual elements into a unitary structure is not only inefficient and economically wasteful, but also necessarily creates hazards of gap misalignment and consequent gap scatter.

Figure 4:
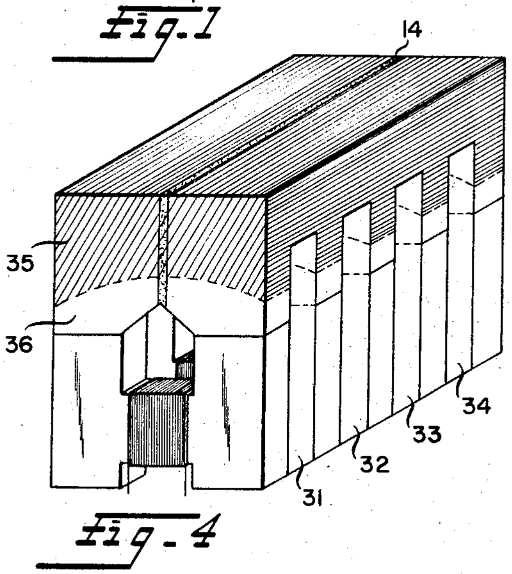
FIGURE 4 is a perspective view of the ferrite blocks secured to coiled jumpers before the machining of the unit.
Figures 5, 6:
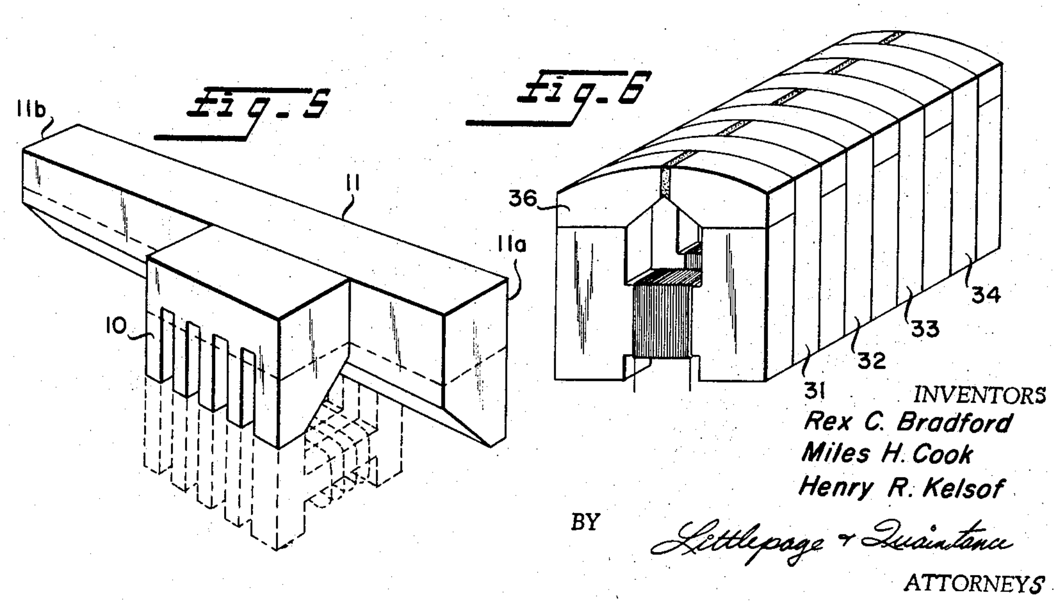
FIGURE 5 is a perspective view of an alternative embodiment of the device shown in FIGURE 4, in which one of the ferrite blocks is shown longer than the other.
FIGURE 6 illustrates a complete magnetic head assembly as prepared by the procedure of the present invention.

However, in accordance with the present invention, risks of gap misalignment and gap scatter are substantially effectively eliminated by making the desired number of single track elements substantially complete in one operation. This is done by removing, by machining etc., the excess portions, shown as cross-hatched area 35 in FIGURE 4, of the original glass bonded blocks 10, 11 only after the modular unit 36 is complete in every other respect; that is, the channels have been properly formed, projections finished and shields or fillers suitably positioned and secured in their respective channels or voids. Thus it will be seen that by the process of this invention an optically perfectly aligned unitary structure comprising a multiplicity of single track elements is formed (FIGURE 6). If desired, a final finish of a desired quality and shape is applied to that surface of the structure 35 which during the operation of the device will come in contact with the recording medium.

In FIGURE 5 is shown an alternative manner of carrying out the process of this invention. In this embodiment one of the two ferrite blocks, for example block 11, is slightly longer than the other. Its protruding surfaces **11*a* and 11*b*** serve as convenient references for locating the grinder for machining operations described above.

It will thus be seen that the procedure of this invention not only provides a novel and a highly efficient method of making an improved multitrack magnetic head having closely spaced and an optically perfectly aligned multiplicity of individual track elements, but it also provides a method of making a multitrack magnetic element and a single track element simultaneously. For example, when it is desired to make a multitrack element and a single track element at the same time, a void or a channel may be left empty, or in the alternative a temporary or removable shield may be inserted in the void, while permanent shield or fillers are positioned and firmly secured in other channels or voids.

While the invention has been particularly shown and described with reference to a preferred embodiment thereof, it will be understood by those skilled in the art that various changes in form and details may be made therein without departing from the spirit and scope of the invention:

What is claimed is:

1. The method of making a multitrack magnetic head comprising:

providing each of a pair of blocks of a high resistivity material with an optically flat polished planar surface;

locating said blocks so that said surfaces are spaced slightly from each other in confronting relation;

joining said blocks to each other by means of a bonding material;

providing a plurality of projections on one block which are spaced from but confront a like number of projections on the other block by forming at least one channel extending into each of said blocks and into said bonding material;

attaching a coiled jumper assembly to each confronting pair of projections;

securing a shield into each channel in such manner that each pair of confronting projections is secured to its closest adjacent neighboring pair of projections both by means of an intervening shield and by means of that portion of each block and that portion of the bonding material that lie beyond said projections;

and removing at least said portions of each block and said portion of bonding material whereby a plurality of functionally independant tracks is formed in a single head unit.

2. The method of claim 1, in which said blocks are of a ferrite material and said bonding material joining said blocks is glass of a suitable composition.

3. The method of making a multitrack magnetic head as defined in claim 2, wherein a plurality of spaced channels are cut and a shield is omitted from at least one of said voids so that upon removal of that portion of each said block and said bonding material that lie beyond said projections said head assembly is cut into at least two separate sections one of which sections comprises a unitary structure having a multiplicity of individual single track elements while the other section comprises a single element.

4. The method of claim 2 in which a plurality of spaced channels are cut and a temporary shield is inserted in at least one of said voids so that upon subsequent removal of that portion of each said block and said bonding material that lies beyond said projections, said head assembly is cut into at least two separate sections, one of said sections having a plurality of single track individual elements and the other section having a single element.

5. The method of making a multitrack magnetic head in accordance with claim 2 in which said jumpers are of H-shape.

6. The method of making a multitrack magnetic head according to claim 2 wherein a portion of the planar surface on one of said pair of ferrite blocks extends beyond the planar surface on the other block so as to provide locator means for subsequent machining.

7. The combination of claim 2, including a V-groove cut into said blocks of a ferrite material in such manner that the apex of the V-groove is at the bonded joint between said blocks and the respective arms of the V constitute substantially symmetrical cuts into the respective facing blocks.

8. The method of making a magnetic multitrack head assembly for use in a recording and reproducing equipment in accordance with claim 7, in which said shields are positioned and secured in their respective channels before said jumpers are bonded to said projections.

9. In a method of making a multitrack magnetic head the improvement comprising:

providing each of a pair of blocks of a ferrite material with an optically flat polished planar surface;

locating said blocks so that said surfaces are spaced slightly from each other in confronting relation;

joining said blocks to each other by means of a non-magnetic bonding material;

providing a plurality of projections on one block which are spaced from but confront a like number of projections on the other block by forming at least one channel extending into each of said blocks and into said bonding material;

securing a shield into each channel in such a manner that each pair of confronting projections is secured to its closest adjacent neighboring pair of projections both by means of an intervening shield and by means of that portion of each block and that portion of the bonding material that lie beyond said projections and removing at least said portion of each block and said portion of bonding material so that a plurality of functionally independent tracks are formed in a single head unit.

References Cited

UNITED STATES PATENTS

| | | | |
|---|---|---|---|
| 3,258,542 | 6/1966 | Pfost | 340—174.1 |
| 3,145,452 | 8/1964 | Camras | 29—603 |
| 3,070,670 | 12/1962 | Eldridge et al. | 179—100.2 |

BERNARD KONICK, *Primary Examiner.*

A. I. NEUSTADT, *Assistant Examiner.*